United States Patent
Yamamoto et al.

(10) Patent No.: US 10,059,802 B2
(45) Date of Patent: Aug. 28, 2018

(54) METHOD FOR PRODUCING POLYPHENYLENE ETHER

(71) Applicant: ASAHI KASEI KABUSHIKI KAISHA, Chiyoda-ku, Tokyo (JP)

(72) Inventors: Shigeru Yamamoto, Tokyo (JP); Akira Mitsui, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 0 days.

(21) Appl. No.: 15/465,812

(22) Filed: Mar. 22, 2017

(65) Prior Publication Data
US 2017/0275424 A1 Sep. 28, 2017

(30) Foreign Application Priority Data

Mar. 28, 2016 (JP) .................. 2016-064528

(51) Int. Cl.
*C08G 63/02* (2006.01)
*C08G 65/44* (2006.01)
*C08G 65/46* (2006.01)

(52) U.S. Cl.
CPC ............. *C08G 65/44* (2013.01); *C08G 65/46* (2013.01)

(58) Field of Classification Search
USPC ................ 523/160; 528/211, 215, 217, 218
See application file for complete search history.

(56) References Cited

U.S. PATENT DOCUMENTS 3,789,054 A * 1/1974 Izawa ..................... C08F 12/04
526/65
2004/0249109 A1 * 12/2004 Mitsui ................... C08G 65/46
528/86

FOREIGN PATENT DOCUMENTS

JP 2000281781 A 10/2000

* cited by examiner

*Primary Examiner* — Terressa Boykin
(74) *Attorney, Agent, or Firm* — Kenja IP Law PC

(57) ABSTRACT

Provided is a method for producing polyphenylene ether (PPE) having excellent mechanical properties, heat aging resistance, and color, and in which the content of impurities such as low molecular weight components and catalyst metal is low. The method for producing PPE includes: performing oxidative polymerization of a phenolic compound in a polymerization solution containing the phenolic compound, a catalyst, and an aromatic solvent to obtain a PPE mixed liquid; precipitating PPE to obtain a slurry containing particulate PPE through addition of a polar solvent to the PPE mixed liquid; solid-liquid separating the slurry to obtain wet PPE particles; washing the wet PPE particles to obtain PPE particles through at least one cycle of a washing and solid-liquid separation process in which washing is performed with a washing liquid containing an aromatic solvent and a polar solvent, and in which solid-liquid separation is performed; and drying the PPE particles.

8 Claims, No Drawings

METHOD FOR PRODUCING POLYPHENYLENE ETHER

TECHNICAL FIELD

This disclosure relates to a method for producing polyphenylene ether.

BACKGROUND

Modified polyphenylene ether resins obtained using polyphenylene ether (hereinafter, also referred to simply as "PPE") as a raw material can be used to produce products and components with desired shapes through molding methods such as melt-injection molding and melt-extrusion molding. Therefore, modified PPE resins are used as materials for products and components in various industrial material fields, such as in the electrical and electronic industry and the automotive industry.

In a known conventional method for producing PPE, a phenolic compound is subjected to oxidative polymerization in the presence of a metal catalyst and an amine in a good solvent for PPE. A method has also been proposed by which a PPE solution obtained through the aforementioned method is heated to evaporate the good solvent and concentrate PPE prior to isolation of PPE from the PPE solution. Moreover, according to a known method, a liquid containing a poor solvent for PPE is added to the PPE solution to precipitate PPE, which is then solid-liquid separated, washed with a poor solvent for PPE, and then solid-liquid separated once again (refer to PTL 1).

CITATION LIST

Patent Literature

PTL 1: JP 2000-281781 A

SUMMARY

At the stage at which wet PPE is obtained, low molecular weight PPE components (for example, oligomer, trimer, and dimer) and metal are still contained in the wet PPE. Washing out of these low molecular weight components and residual metal would allow improvement of mechanical properties, heat aging resistance, and so forth of the final product. However, the method in PTL 1 cannot sufficiently reduce the amount of low molecular weight components and catalyst metal. Therefore, it would be helpful to provide a method for producing PPE in which the content of low molecular weight components and residual metal is low.

In production of PPE, PPE powder may be obtained by adding a poor solvent to a PPE mixed liquid obtained after polymerization, solid-liquid separating PPE and solvent, repeatedly washing the separated solid content through addition of a washing liquid followed by solid-liquid separation, and drying the resultant wet PPE particles. The process described above produces waste liquids such as the following.

Waste liquid 1: Filtrate (separated liquid) from solid-liquid separation
Waste liquid 2: Filtrate (separated liquid) from washing
Waste liquid 3: Vent gas condensate from drying of wet PPE particles Recovery and use of these waste liquids effectively lowers production cost. The waste liquids 1-3 have a good solvent for PPE and a poor solvent for PPE as main components, and contain small amounts of water, an amine compound, and so forth. Each component can be separated and recovered from these mixed liquids by distillation or the like.

However, in a situation in which an aromatic compound solvent is used as the good solvent for PPE and a polar solvent such as methanol is used as the poor solvent for PPE, the good solvent and the poor solvent may form an azeotrope. Separation of the good solvent and the poor solvent can be performed in this situation by adding a water-containing liquid to adjust the mass ratio of water to the poor solvent (water/poor solvent) to 0.5 to 1.5, and then phase separating an organic phase having the good solvent as a main component and an aqueous phase having the poor solvent and water as main components. The good solvent, the poor solvent, and water can then be recovered through distillation of the obtained organic phase and distillation of the obtained aqueous phase.

The present disclosure is made in view of the problems described above and has an objective of providing a method for producing PPE having excellent mechanical properties, heat aging resistance, and color, and in which the content of impurities such as low molecular weight components and catalyst metal is low.

As a result of diligent investigation, the inventors discovered that by including a good solvent (in particular, an aromatic solvent) in a washing liquid used in washing of wet PPE particles obtained after solid-liquid separation, the content of low molecular weight components, such as oligomer, trimer, and dimer, can be significantly reduced and the content of residual metal coordinated with these low molecular weight components can also be reduced such that PPE having significantly improved mechanical properties, heat aging resistance, and color can be obtained.

Specifically, the present disclosure provides the following.

(1) A method for producing polyphenylene ether comprising:
performing oxidative polymerization of a phenolic compound in a polymerization solution containing the phenolic compound, a catalyst, and at least one aromatic solvent selected from the group consisting of benzene, toluene, xylene, and ethylbenzene to obtain a polyphenylene ether mixed liquid;
precipitating polyphenylene ether to obtain a slurry containing particulate polyphenylene ether by adding, to the polyphenylene ether mixed liquid, at least one polar solvent selected from the group consisting of water, a ketone having a carbon number of 1-10, and an alcohol having a carbon number of 1-10;
solid-liquid separating the slurry to obtain wet polyphenylene ether particles;
washing the wet polyphenylene ether particles to obtain polyphenylene ether particles through at least one cycle of a washing and solid-liquid separation process in which washing is performed with a washing liquid containing at least one aromatic solvent selected from the group consisting of benzene, toluene, xylene, and ethylbenzene and at least one polar solvent selected from the group consisting of water, a ketone having a carbon number of 1-10, and an alcohol having a carbon number of 1-10, and in which solid-liquid separation is performed; and
drying the polyphenylene ether particles.

(2) The method for producing polyphenylene ether according to (1), wherein
at least two cycles of the washing and solid-liquid separation process are performed in the washing.

(3) The method for producing polyphenylene ether according to (1) or (2), wherein in a final cycle of the washing and solid-liquid separation process in the washing, the polyphenylene ether particles are obtained by solid-liquid separation after washing with a washing liquid containing 3.5 mass % to 15 mass % of the aromatic solvent and 85 mass % to 96.5 mass % of the polar solvent.

(4) The method for producing polyphenylene ether according to any one of (1) to (3), wherein the washing liquid contains 3.5 mass % to 15 mass % of the aromatic solvent and 85 mass % to 96.5 mass % of the polar solvent.

(5) The method for producing polyphenylene ether according to any one of (1) to (4), wherein polyphenylene ether is obtained in which content of polyphenylene ether components having a molecular weight of 500 or less is 0.3 mass % or less.

(6) The method for producing polyphenylene ether described in any one of (1) to (5), further comprising obtaining a recovered solution or a purified recovered solution resulting from purification of the recovered solution, the recovered solution containing at least one selected from the group consisting of a separated liquid separated in the solid-liquid separating, a separated liquid separated in the washing, and a condensate liquefied from vent gas vaporized in the drying, wherein the recovered solution or the purified recovered solution that is obtained is used as the washing liquid.

Through the presently disclosed method for producing PPE, it is possible to provide a method for producing PPE having excellent mechanical properties, heat aging resistance, and color, and in which the content of impurities such as low molecular weight components and catalyst metal is low.

DETAILED DESCRIPTION

The following provides a detailed description of an embodiment of this disclosure (hereinafter, referred to as the "present embodiment"). However, the present disclosure is not limited to the following embodiment and may be implemented with various alterations that are within the essential scope thereof.

(Method for Producing Polyphenylene Ether (PPE))

A presently disclosed method for producing PPE includes:

a polymerization step of performing oxidative polymerization of a phenolic compound in a polymerization solution containing the phenolic compound, a catalyst, and at least one aromatic solvent selected from the group consisting of benzene, toluene, xylene, and ethylbenzene to obtain a polyphenylene ether mixed liquid (PPE mixed liquid);

a precipitation step of precipitating polyphenylene ether to obtain a slurry containing particulate polyphenylene ether by adding, to the polyphenylene ether mixed liquid, at least one polar solvent selected from the group consisting of water, a ketone having a carbon number of 1-10, and an alcohol having a carbon number of 1-10;

a solid-liquid separation step of solid-liquid separating the slurry to obtain wet polyphenylene ether particles;

a washing step of washing the wet polyphenylene ether particles to obtain polyphenylene ether particles through at least one cycle of a washing and solid-liquid separation process in which washing is performed with a washing liquid containing at least one aromatic solvent selected from the group consisting of benzene, toluene, xylene, and ethylbenzene and at least one polar solvent selected from the group consisting of water, a ketone having a carbon number of 1-10, and an alcohol having a carbon number of 1-10, and in which solid-liquid separation is performed, and a drying step of drying the polyphenylene ether particles.

The polymerization step may be carried out by, for example, passing an oxygen-containing gas through a polymerization solution containing a phenolic compound, an aromatic solvent that is a good solvent for PPE, and a catalyst including a metal catalyst, a halogen compound, and an amine compound, and performing oxidative polymerization of the phenolic compound.

After the polymerization step, a catalyst extraction step may be carried out in which the metal catalyst is removed from the PPE mixed liquid by adding a chelating agent solution to the PPE mixed liquid, extracting the metal catalyst into the chelating agent solution, and liquid-liquid separating a phase of the aromatic solvent and a phase of the chelating agent solution. The catalyst can be extracted to a greater extent in the catalyst extraction step by repeatedly adding water and performing liquid-liquid separation with respect to the PPE mixed liquid obtained after addition of the chelating agent solution and liquid-liquid separation. Note that the PPE mixed liquid obtained after extraction of the catalyst in the catalyst extraction step may also be referred to using the terms "polyphenylene ether mixed liquid" and "PPE mixed liquid" in the present specification.

A concentration step in which the good solvent is separated from the PPE mixed liquid to concentrate PPE may be carried out after the polymerization step or after the catalyst extraction step. Note that the PPE mixed liquid obtained after concentration of PPE in the concentration step may also be referred to using the terms "polyphenylene ether mixed liquid" and "PPE mixed liquid" in the present specification. Either or both the catalyst extraction step and the concentration step may be carried out.

Once concentration and the like have been carried out as necessary, the precipitation step may be carried out by, for example, adding a poor solvent for PPE to the PPE mixed liquid and mixing the poor solvent for PPE therewith to precipitate PPE and obtain a slurry. The poor solvent for PPE contains at least one polar solvent selected from the group consisting of water, a ketone having a carbon number of 1-10, and an alcohol having a carbon number of 1-10.

The solid-liquid separation step may be carried out by, for example, solid-liquid separating the slurry obtained after precipitation to obtain wet PPE particles.

The washing step may be carried out by, for example, repeatedly performing a process in which the wet PPE particles are washed with a washing liquid containing a good solvent and a poor solvent, and in which solid-liquid separation is performed to obtain PPE particles. The good solvent includes at least an aromatic solvent such as described above and the poor solvent includes at least a polar solvent such as described above.

The drying step may be carried out by, for example, drying the PPE particles obtained after washing to yield PPE.

The following provides a detailed description of PPE obtained through the production method of the present embodiment.

<PPE (Polyphenylene Ether)>

PPE produced by the production method of the present embodiment is a homopolymer and/or copolymer including a repeating unit structure represented by general formula (1), shown below.

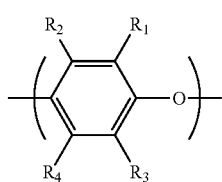

(1)

In formula (1), $R_1$, $R_2$, $R_3$, and $R_4$ are each, independently of one another, selected from the group consisting of a hydrogen atom, a halogen atom, an alkyl group having a carbon number of 1-7, a phenyl group, a haloalkyl group, an aminoalkyl group, an oxyhydrocarbon group, and an oxyhalohydrocarbon group in which a halogen atom and an oxygen atom are separated by at least two carbon atoms.

A halogen atom represented by any of $R_1$, $R_2$, $R_3$, and $R_4$ in formula (1) may, for example, be a fluorine atom, a chlorine atom, or a bromine atom, and is preferably a chlorine atom or a bromine atom.

An alkyl group represented by any of $R_1$, $R_2$, $R_3$, and $R_4$ in formula (1) is preferably a linear or branched alkyl group having a carbon number of 1-6, and more preferably a linear or branched alkyl group having a carbon number of 1-3. The alkyl group may, for example, be a methyl group, an ethyl group, a propyl group, an isopropyl group, a butyl group, an isobutyl group, a sec-butyl group, a tert-butyl group, a pentyl group, or a hexyl group. Of these groups, a methyl group or an ethyl group is preferable, and a methyl group is more preferable.

Moreover, an alkyl group represented by any of $R_1$, $R_2$, $R_3$, and $R_4$ in formula (1) may be substituted with one or more substituents at substitutable positions.

Examples of possible substituents include a halogen atom (for example, a fluorine atom, a chlorine atom, or a bromine atom), an alkyl group having a carbon number of 1-6 (for example, a methyl group, an ethyl group, a propyl group, an isopropyl group, a butyl group, an isobutyl group, a sec-butyl group, a tert-butyl group, a pentyl group, or a hexyl group), an aryl group (for example, a phenyl group or a naphthyl group), an alkenyl group (for example, an ethenyl group, a 1-propenyl group, or a 2-propenyl group), an alkynyl group (for example, an ethynyl group, a 1-propynyl group, or a 2-propynyl group), an aralkyl group (for example, a benzyl group or a phenethyl group), and an alkoxy group (for example, a methoxy group or an ethoxy group).

Specific examples of PPE homopolymers include, but are not limited to, poly(2,6-dimethyl-1,4-phenylene) ether, poly (2-methyl-6-ethyl-1,4-phenylene) ether, poly(2,6-diethyl-1, 4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-hydroxyethyl-1,4-phenylene) ether, and poly(2-methyl-6-chloroethyl-1,4-phenylene) ether. Of these examples, poly (2,6-dimethyl-1,4-phenylene) ether is preferable from a viewpoint of low raw material cost and ease of acquisition.

Specific examples of PPE copolymers include, but are not limited to, a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol, and o-cresol. Of these examples, a copolymer of 2,6-dimethylphenol and 2,3,6-trimethylphenol is preferable from a viewpoint of low raw material cost and ease of acquisition.

(Content of Low Molecular Weight Components)

The content of PPE components having a molecular weight of 500 or less in PPE produced by the production method of the present embodiment is preferably 0.3 mass % or less, more preferably 0.27 mass % or less, and even more preferably 0.25 mass % or less.

The molecular weight of PPE can be measured by a gel permeation chromatography (hereinafter, also referred to as "GPC") measurement device. Specifically, the GPC measurement may be carried out using a "Gel Permeation Chromatography System 21" produced by Showa Denko K.K. (column: two "K-805L" columns produced by Showa Denko K.K. in series; column temperature: 40° C.; solvent: chloroform; solvent flow rate: 1.0 mL/min; sample concentration: 1 g/L chloroform solution of polyphenylene ether) and by plotting a calibration curve using standard polystyrene (standard polystyrene having molecular weights of 3,650,000, 2,170,000, 1,090,000, 681,000, 204,000, 52,000, 30,200, 13,800, 3,360, 1,300, and 550). The UV wavelength of the detector can be selected as 254 nm for standard polystyrene and can be selected as 283 nm for PPE. The content of low molecular weight components can be determined by calculating the content of components having a molecular weight of 500 or less from a molecular weight distribution measured by GPC.

Examples of PPE components having a molecular weight of 500 or less include a dimer, trimer, and oligomer of the phenolic compound. The content of PPE components having a molecular weight of 500 or less can be adjusted, for example, through the composition of the polymerization solution, the conditions in the polymerization step, the composition of the washing liquid, and the conditions in the washing step.

(Content of Residual Metal)

PPE produced by the production method of the present embodiment preferably has a low content of residual metal due to the metal catalyst used in polymerization and the like. Specifically, the concentration of residual metal in PPE produced by the production method of the present embodiment is preferably 0.8 mass ppm or less, more preferably 0.7 mass ppm or less, and even more preferably 0.6 mass ppm or less from a viewpoint of improving heat aging resistance.

The concentration of residual metal can be measured by the method described further below in the EXAMPLES section. The residual metal can be adjusted, for example, through the conditions in the catalyst extraction step, the composition of the washing liquid, and the conditions in the washing step.

(Content of Residual Solvent)

PPE produced by the production method of the present embodiment preferably has a low content of residual solvent. Specifically, the concentration of residual volatile content in PPE produced by the production method of the present embodiment is preferably less than 1.5 mass %, more preferably 0.3 mass % or less, and even more preferably 0.2 mass % or less in consideration of the operation environment during processing of the produced PPE, and in order to prevent back flow of residual volatile content gas during extrusion processing and ensure stable operation.

The concentration of residual volatile content can be measured by the method described further below in the EXAMPLES section. The residual volatile content can be adjusted, for example, through the composition of the washing liquid and the conditions in the washing step.

(Dispersity)

Dispersity, expressed as weight average molecular weight (Mw)/number average molecular weight (Mn), can be used as an index indicating the molecular weight distribution of PPE produced by the production method of the present embodiment. A smaller value for the dispersity indicates a narrower molecular weight distribution. The dispersity has a minimum value of 1.

The dispersity of PPE produced by the production method of the present embodiment is preferably 2.5 to 3.5.

The following provides a detailed description of each step in the method for producing PPE of the present embodiment.

<Polymerization Step>

(Polymerization Solution)

—Phenolic Compound—

Examples of phenolic compounds that can be used include o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2-phenylphenol, 2,6-diphenylphenol, 2,6-bis(4-fluorophenyl)phenol, 2-methyl-6-tolylphenol, 2,6-ditolylphenol, 2,5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-6-n-propylphenol, 2-methyl-5-chlorophenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorophenol, 2-methyl-5-phenylphenol, 2,5-diphenylphenol, 2,5-bis(4-fluorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-di-t-butyl-3-methylphenol, 2,6-dimethyl-3-n-butylphenol, and 2,6-dimethyl-3-t-butylphenol.

In particular, 2,6-dimethylphenol, 2,6-diethylphenol, 2,6-diphenylphenol, 2,3,6-trimethylphenol, and 2,5-dimethylphenol are preferable, and 2,6-dimethylphenol and 2,3,6-trimethylphenol are more preferable due to their low cost and ease of acquisition.

One phenolic compound may be used individually, or two or more phenolic compounds may be used in combination.

For example, a combination of 2,6-dimethylphenol and 2,6-diethylphenol, a combination of 2,6-dimethylphenol and 2,6-diphenylphenol, a combination of 2,3,6-trimethylphenol and 2,5-dimethylphenol, or a combination of 2,6-dimethylphenol and 2,3,6-trimethylphenol may be used as the aforementioned phenolic compound. When two or more phenolic compounds are used, the mixing ratio of these phenolic compounds may be freely selected.

The phenolic compound may contain a small amount of m-cresol, p-cresol, 2,4-dimethylphenol, 2,4,6-trimethylphenol, or the like as a side-product of production.

—Aromatic Solvent—

At least one selected from the group consisting of benzene, toluene, xylene, and ethylbenzene is used as the aromatic solvent. The aromatic solvent is a good solvent for PPE. Of these aromatic solvents, toluene is preferable in terms of ease of removal of residual solvent in the drying step.

Note that the polymerization solution may also contain styrene.

It is preferable that the aromatic solvent is substantially immiscible with water. Moreover, it is preferable that the polymerization solution does not substantially contain a solvent that is miscible with water.

—Catalyst—

The catalyst may be a catalyst that is generally used in polymerization for forming PPE.

Examples of the catalyst include a metal catalyst, a halogen compound, an amine compound, and a catalyst including a mixture thereof. For example, a mixture of a transition metal ion serving as a metal catalyst having oxidation-reduction capability and an amine compound capable of complexation with the transition metal ion may be used as the catalyst. Specific examples include a mixture of a copper compound and an amine compound, a mixture of a manganese compound and an amine compound, and a mixture of a cobalt compound and an amine compound. Of these examples, a mixture of a copper compound and an amine compound is preferable.

——Metal Catalyst——

The metal catalyst of the catalyst is preferably a copper compound.

The copper compound may be a cuprous compound, a cupric compound, or a mixture of a cuprous compound and a cupric compound. Examples of cuprous compounds that can be used include cuprous chloride, cuprous bromide, cuprous sulfate, and cuprous nitrate. Examples of cupric compounds that can be used include cupric oxide, cupric chloride, cupric bromide, cupric sulfate, and cupric nitrate. Of these examples, cupric oxide, cuprous chloride, cupric chloride, cuprous bromide, and cupric bromide are preferable.

These copper salts can be synthesized at the time of use from copper oxide (for example, cuprous oxide), copper carbonate, copper hydroxide, or the like and a corresponding halogen or acid (for example, from cuprous oxide and a hydrogen halide (or a hydrogen halide solution)).

One of such metal catalysts may be used individually, or two or more of such metal catalysts may be used in combination.

——Halogen Compound——

Specific examples of halogen compounds that can be used include, but are not limited to, hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide, and tetraethylammonium iodide. These halogen compounds may be used in the form of an aqueous solution or a solution with an appropriate solvent. Of such solutions, an aqueous solution of hydrogen chloride or an aqueous solution of hydrogen bromide is preferable.

One of such halogen compounds may be used individually, or two or more of such halogen compounds may be used in combination.

——Amine Compound——

Examples of amine compounds that can be used include diamine compounds, secondary monoamine compounds, and tertiary monoamine compounds. Of these amine compounds, it is preferable that a diamine compound is included, and more preferable that a diamine compound, a secondary monoamine compound, and a tertiary monoamine compound are included.

One amine compound may be used individually, or two or more amine compounds may be used in combination.

The diamine compound is preferably a diamine compound represented by general formula (2), shown below.

The catalyst may, for example, be a catalyst that includes a copper compound, a halogen compound, and a diamine compound represented by the following general formula (2). Use of a catalyst such as described above tends to raise the polymerization rate and shorten the polymerization time. Moreover, adjustment of the amount of the catalyst, the amount of blown oxygen, the polymerization time, and so forth tends to facilitate adjustment of the molecular weight obtained after polymerization.

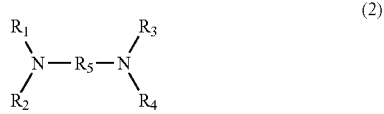

(2)

In formula (2), $R_1$, $R_2$, $R_3$, and $R_4$ are each, independently of one another, a hydrogen atom or a linear or branched alkyl group having a carbon number of 1-6. However, $R_1$, $R_2$, $R_3$, and $R_4$ are not all hydrogen atoms. $R_5$ is a linear or branched alkylene group having a carbon number of 2-5.

Specific examples of diamine compounds represented by general formula (2) include, but are not limited to, N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N.N'-di-n-propylethylenediamine, N-i-propylethylenediamine, N,N'-di-i-propylethylenediamine, N-n-butylethylenediamine, N,N'-di-n-butylethylenediamine, N-i-butylethylenediamine, N,N'-di-i-butylethylenediamine, N-t-butylethylenediamine, N,N'-di-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane, and N,N,N',N'-tetramethyl-1,5-diaminopentane. Of these diamine compounds, a diamine compound for which $R_5$ in formula (2) is an alkylene group having a carbon number of 2 or 3 is preferable.

Although no specific limitations are placed on the amount of the diamine compound that is used, the amount is preferably 0.01 moles to 10 moles per 100 moles of the phenolic compound.

Examples of tertiary monoamine compounds that can be used include, but are not limited to, aliphatic tertiary amines, inclusive of alicyclic tertiary amines. Specific examples of such tertiary monoamine compounds include, but are not limited to, trimethyl amine, triethylamine, tripropylamine, tributylamine, triisobutylamine, dimethylethylamine, dimethylpropylamine, allyldiethylamine, N-butyldimethylamine, diethylisopropylamine, and N-methylcyclohexylamine.

One tertiary monoamine compound may be used individually, or two or more tertiary monoamine compounds may be used in combination.

Although no specific limitations are placed on the amount of the tertiary monoamine compound that is used, the amount is preferably 15 moles or less per 100 moles of the phenolic compound.

All the tertiary monoamine compound may be added before polymerization, or a portion of the tertiary monoamine compound may be added before polymerization and the remainder of the tertiary monoamine compound may be added sequentially during polymerization. Moreover, the tertiary monoamine compound may be mixed with the phenolic compound before being added to the polymerization solution at the same time as polymerization is initiated.

Examples of secondary monoamine compounds that can be used include, but are not limited to, secondary aliphatic amines. Specific examples of secondary aliphatic amines that can be used include, but are not limited to, dimethylamine, diethylamine, di-n-propylamine, di-i-propylamine, di-n-butylamine, di-i-butylamine, di-t-butylamine, dipentylamine, dihexylamine, dioctylamine, didecylamine, dibenzylamine, methylethylamine, methylpropylamine, methylbutylamine, and cyclohexylamine.

The secondary monoamine compound may be an aromatic-containing secondary monoamine compound. Specific examples of aromatic-containing secondary monoamine compounds that can be used include, but are not limited to, N-(substituted or unsubstituted phenyl)alkanolamines such as N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, and N-(p-chlorophenyl)ethanolamine; and N-hydrocarbon-substituted anilines such as N-ethylaniline, N-butylaniline, N-methyl-2-methylaniline, N-methyl-2,6-dimethylaniline, and diphenylamine.

One secondary monoamine compound may be used individually, or two or more secondary monoamine compounds may be used in combination.

Although no specific limitations are placed on the amount of the secondary monoamine compound that is used, the amount is preferably 15 moles or less per 100 moles of the phenolic compound.

A surfactant that is conventionally known to have an effect of enhancing polymerization activity may be added to the polymerization solution.

The surfactant may, for example, be trioctylmethylammonium chloride known by the product names Aliquat 336 (produced by Henkel Co., Ltd.) and CapRiquat (produced by Dojindo Laboratories).

The amount of the surfactant that is used preferably does not exceed 0.1 mass % relative to the total amount of the polymerization solution.

(Passing of Oxygen-Containing Gas)

In the polymerization step, the phenolic compound may be polymerized while passing an oxygen-containing gas through the polymerization solution. Although the timing of initiation of passing of the oxygen-containing gas is not specifically limited, it is preferable to initiate passing of the oxygen-containing gas after introducing any of the phenolic compound, the aromatic solvent, and the catalyst into a reaction vessel in adjustment of the polymerization solution.

Specific examples of oxygen-containing gases that can be used include, but are not limited to, air, a mixture of air and any inert gas, and a mixture of oxygen and any inert gas.

The inert gas is not specifically limited and may, more specifically, be any gas that does not significantly influence the polymerization reaction. A representative example of the inert gas is nitrogen.

Examples of methods by which the phenolic compound can be polymerized in the polymerization step include a method described in U.S. Pat. No. 3,306,874 A in which oxidative polymerization of 2,6-xylenol is carried out using a complex of a cuprous salt and an amine as a catalyst, and methods described in U.S. Pat. No. 3,306,875 A, U.S. Pat. No. 3,257,357 A, U.S. Pat. No. 3,257,358 A, JP S52-17880 B, JP S50-51197 A, and JP S63-152628 A.

<Catalyst Extraction Step>

The metal catalyst used as the catalyst can be removed from the PPE mixed liquid in the catalyst extraction step by adding a chelating agent solution to the PPE mixed liquid obtained after the polymerization step, stirring the chelating agent solution with the PPE mixed liquid to extract the metal catalyst into the chelating agent solution, and liquid-liquid separating the PPE mixed liquid and the chelating agent solution.

Examples of the chelating agent used in the chelating agent solution include acids such as hydrochloric acid and acetic acid; ethylenediaminetetraacetic acid (EDTA) and salts thereof, and nitrilotriacetic acid and salts thereof. Although the chelating agent may be added by itself, it is preferable that the chelating agent is added in the form of a chelating agent aqueous solution or the like after being dissolved in a solvent such as water that has low PPE-dissolving capability and phase separates with the aromatic solvent serving as the good solvent for PPE. In a situation in which a chelating agent aqueous solution is used, the metal catalyst, which is deactivated through bonding to the chelating agent, is extracted into the aqueous phase, and thus can be separated from PPE contained in the organic phase.

The metal catalyst may be extracted to a greater extent in the catalyst extraction step by repeatedly adding water and performing liquid-liquid separation with respect to the PPE mixed liquid obtained after the chelating agent solution has been added and liquid-liquid separation has been carried out.

Two-phase separation in the catalyst extraction step and the washing step described further below may be performed by static separation or using a liquid-liquid separating machine.

<Concentration Step>

The method for producing PPE of the present embodiment may include a concentration step of concentrating PPE by separating a polymerization solvent, such as an aromatic solvent, from the PPE mixed liquid obtained after the catalyst extraction step.

Examples of methods by which PPE can be concentrated include a method in which the PPE mixed liquid is heated in a heating medium at the boiling point of the good solvent for PPE or higher to remove the good solvent for PPE from the system as vapor; a method in which the PPE mixed liquid is introduced into a reduced pressure tank to flash a polymerization solvent, such as an aromatic solvent; and a method in which the PPE mixed liquid is heated under pressure and the pressure is subsequently reduced to flash a polymerization solvent, such as an aromatic solvent.

<Precipitation Step>

The production method of the present embodiment includes a precipitation step of precipitating PPE to obtain a slurry containing particulate polyphenylene ether by adding, to the PPE mixed liquid, a polar solvent that is a poor solvent for PPE, and then mixing the good solvent for PPE and the poor solvent for PPE.

(Polar Solvent)

The polar solvent added to the PPE mixed liquid is a poor solvent for PPE that does not dissolve PPE at all or only slightly dissolves PPE. At least one selected from the group consisting of water, a ketone having a carbon number of 1-10, and an alcohol having a carbon number of 1-10 is used as the polar solvent. Examples of polar solvents that can be used include methanol, ethanol, propanol, isopropanol, n-butanol, 2-butanol, pentanol, hexanol, ethylene glycol, acetone, methyl ethyl ketone, and water. Of these polar solvents, methanol, ethanol, isopropanol, n-butanol, 2-butanol, acetone, methyl ethyl ketone, or water is preferably used. Alcohols having a carbon number of 1-10 are also preferable as the polar solvent.

One polar solvent may be used individually, or two or more polar solvents may be used in combination.

The amount of the polar solvent that is added in the precipitation step is preferably set such that the amount of the polar solvent as a proportion by mass relative to the good solvent in the PPE mixed liquid (mass of polar solvent/mass of good solvent) is 0.3 to 2.0 in order to facilitate precipitation of polyphenylene ether without causing precipitation of components other than polyphenylene ether.

<Solid-Liquid Separation Step>

The slurry obtained after the precipitation step as a result of addition of the polar solvent to precipitate PPE is in the form of a slurry (suspension) having particulate PPE present in a mixed liquid of an aromatic solvent that is a good solvent and a polar solvent that is a poor solvent.

In the solid-liquid separation step, a solid-liquid separation device may be used to separate the slurry into wet PPE particles and a filtrate (separated liquid) as a first stage in isolation of PPE. Examples of solid-liquid separation devices that can be used include, but are not limited to, a centrifugal separator (for example, a vibrating, screw, decanter, or basket-type centrifugal separator), a vacuum filter (for example, a drum filter, belt filter, rotary vacuum filter, Young filter, or Nutsche filter), a filter press, and a roll press.

A pulverizer may be used to pulverize the wet PPE particles obtained after the solid-liquid separation step. Examples of pulverizers that can be used include a jaw crusher, a cone crusher, a hammer mill, a feather mill, a ball mill, a high-speed rotation mill, and a jet mill.

A dryer or the like may be used to dry the wet PPE particles obtained after the solid-liquid separation step. Examples of dryers that can be used include various types of dryers, a combination of a heat exchanger and a flash tank, and a devolitizing extruder.

<Washing Step>

The wet PPE particles that are separated through the solid-liquid separation step are impregnated with a large amount of a good solvent component such as the aromatic solvent. By washing the wet PPE particles with a washing liquid containing an aromatic solvent and a polar solvent, the content of the good solvent component in the wet PPE particles can be reduced.

The inventors discovered that a large amount of impurities such as low molecular weight components and metal are also contained in the wet PPE particles and that reducing the content of the low molecular weight components and metal enables PPE having excellent mechanical properties, heat aging resistance, and color to be obtained. Moreover, the inventors discover that, surprisingly, the content of impurities such as low molecular weight components and metal in the wet PPE particles can be efficiently reduced through use of a washing liquid containing an aromatic solvent and a polar solvent.

The washing step is a step in which PPE particles are obtained by performing at least one cycle of a washing and solid-liquid separation process in which the wet PPE particles are brought into contact with the washing liquid containing the aromatic solvent and the polar solvent to extract good solvent, low molecular weight components, catalyst metal, and so forth contained therein, and in which solid-liquid separation is subsequently performed.

The aromatic solvent and the polar solvent used in the washing liquid may be freely selected from the previously described aromatic solvents and polar solvents. The aromatic solvent used in the washing liquid may be the same aromatic solvent as used in the polymerization step or a different aromatic solvent. Likewise, the polar solvent used in the washing liquid may be the same polar solvent as used in the precipitation step or a different polar solvent. From a viewpoint of efficiency, it is preferable that the same aromatic solvent and the same polar solvent are used.

At least one cycle of the washing and solid-liquid separation process is performed in the washing step. However, from a viewpoint of obtaining PPE having an even lower content of impurities such as low molecular weight components and metal, it is preferable that at least two cycles of the washing and solid-liquid separation process are performed.

The washing liquid used in the washing and solid-liquid separation process is a washing liquid containing the aromatic solvent and the polar solvent described above. The washing liquid may further contain solvents other than the aromatic solvent and the polar solvent, such as a good solvent for PPE other than the aromatic solvent and a poor solvent for PPE other than the polar solvent. However, it is preferable that the washing liquid contains only the aromatic solvent and the polar solvent.

The content of the aromatic solvent in the washing liquid is preferably 0.5 mass % to 18.0 mass %, more preferably 3.5 mass % to 15 mass %, and even more preferably 5.5 mass % to 15.0 mass % from a viewpoint of obtaining PPE having even lower content of impurities such as low molecular weight components and catalyst metal.

Moreover, the content of the polar solvent in the washing liquid is preferably 82 mass % to 99.5 mass %, more preferably 85 mass % to 96.5 mass %, and even more preferably 85 mass % to 94.5 mass % from a viewpoint of obtaining PPE having even lower content of impurities such as low molecular weight components and catalyst metal.

Of such washing liquids, a washing liquid containing 0.5 mass % to 18.0 mass % of the aromatic solvent and 82.0 mass % to 99.5 mass % of the polar solvent is preferable, a washing liquid containing 3.5 mass % to 15 mass % of the aromatic solvent and 85 mass % to 96.5 mass % of the polar solvent is more preferable, and a washing liquid containing 5.5 mass % to 15.0 mass % of the aromatic solvent and 85.0 mass % to 94.5 mass % of the polar solvent is even more preferable.

In a situation in which two or more cycles of the washing and solid-liquid separation process are performed, washing liquids of the same or different compositions may be used in these cycles of the washing and solid-liquid separation process. However, from a viewpoint of cost and operation efficiency, it is preferable that washing liquids of the same composition are used.

The solid-liquid separation in the washing and solid-liquid separation process may be carried out, for example, using a continuous solid-liquid separating machine or a batch solid-liquid separating machine. The solid-liquid separation in the washing and solid-liquid separation process, for example, enables separation of solid content and liquid content (filtrate, separated liquid). Note that the solid content obtained through a final cycle of the washing and solid-liquid separation process is the PPE particles.

In solid-liquid separation using a continuous solid-liquid separating machine, it is possible to separate solid content and liquid content by solid-liquid separation after washing of the wet PPE particles through addition of the washing liquid containing the aromatic solvent and the polar solvent to precipitate PPE and reform a slurry. Moreover, PPE particles can be obtained by repeatedly adding the washing liquid containing the aromatic solvent and the polar solvent to the separated solid content to form a slurry and performing solid-liquid separation of the slurry. In the case of PPE produced through a washing step including a washing and solid-liquid separation process in which the solid-liquid separation is performed using a continuous solid-liquid separating machine, the contents of residual good solvent, low molecular weight components, and catalyst components can be reduced to desired levels.

In solid-liquid separation using a batch solid-liquid separating machine, rinse washing can be performed in which solid-liquid separation is carried out while spraying the wet PPE particles with the washing liquid containing the aromatic solvent and the polar solvent. In a washing and solid-liquid separation process in which the solid-liquid separation is performed using a batch solid-liquid separating machine, rinse washing can be repeated until the contents of residual good solvent, low molecular weight components, and catalyst components in the resultant PPE are reduced to the desired levels.

In a situation in which two or more cycles of the washing and solid-liquid separation process are performed, the solid-liquid separation may be carried out by the same method or by different methods in these cycles of the washing and solid-liquid separation process. However, from a viewpoint of cost and operation efficiency, it is preferable that the same solid-liquid separation method is used.

In a situation in which two or more cycles of the washing and solid-liquid separation process are performed, a pulverizer may be used to pulverize the solid content obtained after the solid-liquid separation. Examples of pulverizers that can be used include a jaw crusher, a cone crusher, a hammer mill, a feather mill, a ball mill, a high-speed rotation mill, and a jet mill.

Moreover, in a situation in which two or more cycles of the washing and solid-liquid separation process are performed, a dryer or the like may be used to dry the solid content obtained after the solid-liquid separation. Examples of dryers that can be used include various types of dryers, a combination of a heat exchanger and a flash tank, and a devolitizing extruder.

From a viewpoint of efficiently removing low molecular weight components, a final cycle of the washing and solid-liquid separation process in the washing step is preferably carried out by performing washing with a washing liquid containing 3.5 mass % to 15 mass % of the aromatic solvent and 85 mass % to 96.5 mass % of the polar solvent, and subsequently performing solid-liquid separation to obtain polyphenylene ether particles.

Washing of the wet PPE particles with the washing liquid containing the aromatic solvent and the polar solvent can wash out low molecular weight components, such as oligomer, trimer and dimer, and residual metal, such as metal catalyst. This washing out of low molecular weight components and residual metal enables production of PPE having excellent heat aging resistance, color, and mechanical properties such as tensile strength retention and heat deflection temperature (HDT).

<Drying Step>

The good solvent and poor solvent can be separated from the PPE particles obtained after the washing step using a dryer or the like. Examples of dryers that can be used include various types of dryers, a combination of a heat exchanger and a flash tank, and a devolitizing extruder.

<Recovery Step>

The method for producing PPE of the present embodiment may further include a recovery step of obtaining a recovered solution or a purified recovered solution resulting from purification of the recovered solution. The recovered solution contains at least one selected from the group consisting of a separated liquid separated in the solid-liquid separating step, a separated liquid separated in the washing step, and a condensate liquefied from vent gas vaporized in the drying step. The recovered solution or purified recovered solution obtained through the recovery step can be used as the previously described washing liquid.

The recovered solution containing at least one selected from the group consisting of a separated liquid separated in the solid-liquid separating step, a separated liquid separated in the washing step, and a condensate liquefied from vent gas vaporized in the drying step may be purified by the following method in the recovery step to yield the purified recovered solution.

In the purification, water is added to the recovered solution such that the mass ratio of water to poor solvent for PPE (water/poor solvent for PPE) in the recovered solution is 0.5 to 1.5, and two-phase separation is carried out of an organic phase having good solvent for PPE as a main component and an aqueous phase having the poor solvent for PPE and water as main components. The two-phase separation may be performed by static separation or using a liquid-liquid separating machine.

The separated organic phase is recovered and is supplied from a middle stage of a distillation column. Waste liquid containing low molecular weight components, such as oligomer, trimer, and dimer, and the metal catalyst is removed from the bottom of the column and the good solvent for PPE and the amine compound are recovered from the top of the column or as a side cut. The good solvent for PPE recovered from the top of the column can be reused, for example, as the good solvent in the polymerization step.

The separated aqueous phase is supplied from a middle stage of a distillation column. A water-containing liquid that contains the metal catalyst is recovered from the bottom of the column and the poor solvent for PPE is recovered from the top of the column.

The water-containing liquid containing the metal catalyst that is recovered from the bottom of the column is recovered after addition of an alkali metal sulfide and removal of a solid. The recovered water-containing liquid can be reused in the recovery step. The poor solvent for PPE recovered from the top of the column can be reused as the poor solvent in the precipitation step or the washing step.

The recovered solution, or the purified recovered solution obtained through the method described above, can be used as the previously described washing liquid.

By mixing an appropriate amount of the good solvent for PPE purified by the method described above with the poor solvent for PPE purified by the method described above, and then using the resultant liquid as a washing liquid, low molecular weight components, such as oligomer, trimer, and dimer, and residual metal contained in the wet PPE particles can be washed out.

EXAMPLES

The following provides a more specific description based on examples and comparative examples. However, the present disclosure is not limited to the following examples.

First, methods adopted in the examples and comparative examples for measuring physical properties and characteristics are described.

(1) Content of Low Molecular Weight Components (Content (Mass %) of PPE Components Having Molecular Weight of 500 or Less)

A molecular weight distribution was obtained by measurement using a gel permeation chromatography measurement device. Specifically, the GPC measurement was carried out by using a "Gel Permeation Chromatography System 21" produced by Showa Denko K.K. (column: two "K-805L" columns produced by Showa Denko K.K. in series; column temperature: 40° C.; solvent: chloroform; solvent flow rate: 1.0 mL/min; sample concentration: 1 g/L chloroform solution of polyphenylene ether) to plot a calibration curve using standard polystyrene (standard polystyrene having molecular weights of 3,650,000, 2,170,000, 1,090,000, 681,000, 204,000, 52,000, 30,200, 13,800, 3,360, 1,300, and 550). The UV wavelength of the detector was set as 254 nm for standard polystyrene and 283 nm for PPE.

The content (mass %) of PPE components having a molecular weight of 500 or less was calculated from the measured molecular weight distribution.

(2) Amount of Residual Metal (Residual Metal Concentration (Mass ppm))

An atomic absorption spectrophotometer (AA6650 produced by Shimadzu Corporation) was used to measure the residual metal concentration of PPE obtained in each of the examples and comparative examples.

(3) Content of Residual Solvent (Volatile Content Concentration (Mass %))

A sample was taken from PPE obtained in each of the examples and comparative examples and the mass thereof was measured. The sample was dried under reduced pressure for 5 hours under conditions of 185° C. and 0.1 mmHg, and the mass of PPE after drying was measured. The volatile content concentration (mass %) was calculated by the following formula.

$$\text{Volatile content concentration (mass \%)} = \{(\text{Mass of PPE before drying}) - (\text{Mass of PPE after drying})\}/(\text{Mass of PPE before drying}) \times 100$$

(4) Reduced Viscosity ($\eta_{sp}/c$)

PPE obtained in each of the examples and comparative examples was dissolved in chloroform to prepare a 0.5 g/dL chloroform solution. An Ubbelohde viscometer was used to determine the reduced viscosity $\eta_{sp}/c$ (dL/g) at 30° C. using the chloroform solution as a sample.

(5) Tensile Strength
(Preparation of Modified PPE Resin Composition Pellets)

Modified PPE resin composition pellets were prepared under the following conditions using PPE obtained in each of the examples and comparative examples, general purpose polystyrene (hereinafter, also referred to as "GPPS") produced by PS Japan Corporation (product name: Polystyrene 685), and high impact polystyrene (hereinafter, also referred to as "HIPS") produced by Petrochemicals (Malaysia) Sdn Bhd (product name: CT60) as raw materials.

A twin-screw extruder (ZSK 25 produced by Werner & Pfleiderer) was used as a production device. The twin-screw extruder was supplied with 40 parts by mass of PPE and 30 parts by mass of GPPS from an upstream inlet, and 30 parts by mass of HIPS from a mid-stream inlet.

Melt-kneading was performed under conditions of a cylinder temperature of 300° C., a screw rotation speed of 200 rpm, and vacuum degassing of −700 mmHg to prepare modified PPE resin composition pellets.
(Preparation of Molded Pieces)

The modified PPE resin composition pellets were molded to prepare a strip-shaped molded piece of 0.32 cm in thickness and a dumbbell-shaped molded piece of 0.32 cm in thickness.

The molding was performed under conditions of a molding temperature of 330° C. and a mold temperature of 120°

C. using an injection molder (IS-80EPN produced by Toshiba Machine Co., Ltd.) as a molding device.

(Tensile Strength Measurement)

The dumbbell-shaped molded piece of 0.32 cm in thickness was used to measure tensile strength (MPa) in accordance with ASTM D-648 with a test rate of 5 mm/min and a tensing chuck spacing of 115 mm.

(6) Bending Strength Measurement

A strip-shaped molded piece of 0.32 cm in thickness prepared as described in "(5) Tensile strength" was used to measure bending strength (MPa) in accordance with ASTM D-790 with a test rate of 3 mm/min and a support spacing of 101.6 mm.

(7) Charpy Impact Strength

A strip-shaped molded piece of 0.32 cm in thickness prepared as described in "(5) Tensile strength" was used to measure Charpy impact strength ($kJ/m^2$) in accordance with ISO-179 after a notch had been formed therein in accordance with ISO-179.

(8) Heat Aging Resistance

A strip-shaped molded piece of 0.32 cm in thickness prepared as described in "(5) Tensile strength" was subjected to 500 hours of aging in an air circulation oven set to 120° C. and was subsequently left for 24 hours at a room temperature of 23° C. and a humidity of 50%. The resultant strip-shaped molded piece was used to measure Charpy impact strength ($kJ/m^2$) after aging in accordance with ISO-179 after a notch had been formed therein in accordance with ISO-179.

Heat aging resistance (retention rate relative to Charpy impact strength before heat aging; %) was calculated from the following formula using the Charpy impact strength measured in "(7) Charpy impact strength".

Heat aging resistance (%)=(Charpy impact strength after aging)/(Charpy impact strength)×100

(9) Color Index

PPE obtained in each of the examples and comparative examples was used to prepare a chloroform solution having a PPE concentration of 0.05 g/mL. A quartz cell having a cell length of 1 cm was filled with the same chloroform as used to dissolve the PPE. The absorbance of the pure chloroform was measured by ultraviolet light (wavelength: 480 nm) and this absorbance was taken to be 0.

An identical cell was filled with the chloroform solution of PPE and the absorbance thereof was measured at 480 nm. This absorbance was taken to be a color index.

Example 1

A 40 L jacketed polymerization tank equipped with a sparger for introduction of an oxygen-containing gas at the bottom of the polymerization tank, a stirring turbine blade, and a baffle, and having a reflux condenser on a vent gas line at the top of the polymerization tank was charged with 4.57 g of cupric oxide as a metal catalyst, 24.18 g of a 47 mass % hydrogen bromide aqueous solution as a halogen compound, 11.00 g of di-t-butylethylenediamine as a diamine compound, 62.72 g of di-n-butylamine as a secondary amine compound, 149.92 g of butyldimethylamine as a tertiary amine compound, 20.65 kg of toluene as an aromatic solvent, and 3.12 kg of 2,6-dimethylphenol (2,6-Xylenol produced by Asahi Kasei Plastics Singapore Pte. Ltd.) as a phenolic compound, while blowing nitrogen gas into the polymerization tank at a flow rate of 0.5 L/min. The contents of the polymerization tank were stirred until a homogeneous solution was obtained and the internal temperature of the polymerization tank was 25° C.

Next, the sparger was used to introduce dry air into the polymerization tank at a rate of 32.8 L/min and polymerization was initiated. Passing of dry air was continued for 125 minutes while carrying out polymerization. The internal temperature of the polymerization tank during polymerization was controlled to 40° C. A homogeneous solution was obtained at the end of polymerization.

Passing of the dry air was stopped and 10 kg of a 2.5 mass % aqueous solution of a tetrasodium salt of ethylenediaminetetraacetic acid (produced by Dojindo Laboratories) was added to the PPE mixed liquid obtained after polymerization as a chelating agent solution. The PPE mixed liquid was stirred for 150 minutes at 70° C. and was then left to stand for 20 minutes. Thereafter, the organic phase and the aqueous phase were separated by liquid-liquid separation. The separated organic phase was a toluene solution containing 13.1 mass % of PPE.

A 40 L jacketed mixing tank was charged with 20 kg of the separated organic phase. The organic phase was heated by causing 120° C. oil to flow in the jacket and was stirred while blowing nitrogen gas into a gas phase part of the tank at 5 L/min. Vent gas from the mixing tank was passed through a condenser to condense a liquid having toluene as a main component, and this liquid was removed from the mixing tank. The rate at which nitrogen was blown into the gas phase part of the mixing tank was reduced to 0.1 mL/min at the point at which the weight of liquid removed from the mixing tank reached 13.4 kg. The oil temperature of the jacket was lowered to 65° C. and the temperature of the liquid in the mixing tank stabilized at 62° C.

An extraction nozzle at the bottom of the mixing tank was connected to a gear pump and fed to a 1.2 L jacketed precipitation tank.

A mixed liquid of 500 g of toluene and 500 g of methanol was added into the precipitation tank and was mixed by stirring in advance. The stirring was performed at 1,500 rpm using an impeller that was a one-stage, four-blade, inclined paddle blade and that had a diameter equivalent to ⅓ of the internal diameter of the precipitation tank. The precipitation tank included four baffles and had a structure by which contents overflowed and were removed from the tank upon exceeding 1.2 L.

The precipitation tank was fed with 395 g/min of the PPE polymerization liquid obtained after concentration and 240 g/min of methanol containing 6 mass % of water. PPE was precipitated as particles to form a slurry state in a toluene/methanol/water filtrate. The slurry was removed from the precipitation tank via an overflow line.

The slurry was collected 1 L at a time and was filtered under reduced pressure using a glass filter. The resultant wet PPE particles were stirred with 1.0 kg of methanol containing 3.5 mass % of toluene and were then filtered under reduced pressure. Approximately 5 kg of PPE particles were obtained. The PPE particles were dried in a vacuum dryer at 140° C. and 1 mmHg to obtain approximately 2.5 kg of PPE. Table 1 shows the results of evaluations (1) to (9) using the obtained PPE.

Example 2

PPE was obtained in the same way as in Example 1 with the exception that 1.0 kg of methanol containing 5.5 mass % of toluene was added to the wet PPE particles. The results of evaluations (1) to (9) are shown in Table 1.

Example 3

PPE was obtained in the same way as in Example 1 with the exception that 1.0 kg of methanol containing 10.0 mass % of toluene was added to the wet PPE particles. The results of evaluations (1) to (9) are shown in Table 1.

Example 4

PPE was obtained in the same way as in Example 1 with the exception that 1.0 kg of methanol containing 15.0 mass % of toluene was added to the wet PPE particles. The results of evaluations (1) to (9) are shown in Table 1.

Example 5

PPE was obtained in the same way as in Example 1 with the exception that 1.0 kg of methanol containing 18.0 mass % of toluene was added to the wet PPE particles. The results of evaluations (1) to (9) are shown in Table 1.

Example 6

PPE was obtained in the same way as in Example 1 with the exception that 1.0 kg of methanol containing 0.5 mass % of toluene was added to the wet PPE particles. The results of evaluations (1) to (9) are shown in Table 1.

Example 7

PPE was obtained in the same way as in Example 1 with the exception that 1.0 kg of methanol containing 3.5 mass % of toluene was added to and stirred with the wet PPE particles, filtration was then performed under reduced pressure, 1.0 kg of methanol containing 3.5 mass % of toluene was once again added to and stirred with the filtered-off wet PPE particles, and filtration was then performed again under reduced pressure using a glass filter. The results of evaluations (1) to (9) are shown in Table 1.

Example 8

PPE was obtained in the same way as in Example 1 with the exception that 1.0 kg of methanol containing 15.0 mass % of toluene was added to and stirred with the wet PPE particles, filtration was then performed under reduced pressure, 1.0 kg of methanol containing 15.0 mass % of toluene was once again added to and stirred with the filtered-off wet PPE particles, and filtration was then performed again under reduced pressure using a glass filter. The results of evaluations (1) to (9) are shown in Table 1.

Comparative Example 1

PPE was obtained in the same way as in Example 1 with the exception that 1.0 kg of methanol that did not contain toluene was added to the wet PPE particles. The results of evaluations (1) to (9) are shown in Table 1.

TABLE 1

| | | | Example 1 | Example 2 | Example 3 |
|---|---|---|---|---|---|
| Polymerization step | Polymerization solution | Phenolic compound | 2,6-Dimethylphenol | 2,6-Dimethylphenol | 2,6-Dimethylphenol |
| | | Aromatic solvent | Toluene | Toluene | Toluene |
| | | Catalyst | Cupric oxide | Cupric oxide | Cupric oxide |
| | | | Hydrogen bromide aqueous solution | Hydrogen bromide aqueous solution | Hydrogen bromide aqueous solution |
| | | | Di-t-butylethylene diamine | Di-t-butylethylene diamine | Di-t-butylethylene diamine |
| | | | Di-n-butylamine | Di-n-butylamine | Di-n-butylamine |
| | | | Butyldimethylamine | Butyldimethylamine | Butyldimethylamine |
| | | Polymerization conditions | 40° C., 125 minutes | 40° C., 125 minutes | 40° C., 125 minutes |
| Precipitation step | | Polar solvent | Mixed liquid of methanol and water | Mixed liquid of methanol and water | Mixed liquid of methanol and water |
| Solid-liquid separation step | | Separation method | Filtration under reduced pressure | Filtration under reduced pressure | Filtration under reduced pressure |
| Washing step | Washing liquid (first cycle) | Aromatic solvent | Toluene | Toluene | Toluene |
| | | | 3.5 Mass % | 5.5 Mass % | 10.0 Mass % |
| | | Polar solvent | Methanol | Methanol | Methanol |
| | | | 96.5 Mass % | 94.5 Mass % | 90.0 Mass % |
| | | Solid-liquid separation method | Filtration under reduced pressure | Filtration under reduced pressure | Filtration under reduced pressure |
| | Washing liquid (second cycle) | Aromatic solvent | — | — | — |
| | | Polar solvent | — | — | — |
| | | | — | — | — |
| | | Solid-liquid separation method | — | — | — |
| | | No. of washing cycles | 1 | 1 | 1 |
| Drying step | | Drying temperature | 140° C. | 140° C. | 140° C. |
| Evaluation | | (1) Content of low molecular weight components (content (%) of PPE components having molecular weight of 500 or less) | 0.33 | 0.30 | 0.28 |
| | | (2) Content of residual metal (residual metal concentration (mass ppm)) | 0.64 | 0.63 | 0.61 |
| | | (3) Content of residual solvent (volatile content concentration (mass %)) | 0.16 | 0.17 | 0.19 |
| | | (4) Reduced viscosity (dL/g) | 0.51 | 0.51 | 0.52 |
| | | (5) Tensile strength (MPa) | 83 | 84 | 85 |
| | | (6) Bending strength (MPa) | 2164 | 2189 | 2198 |

TABLE 1-continued

|  |  |  | | | |
|---|---|---|---|---|---|
|  | (7) Charpy impact strength (kJ/m$^2$) | | 10.7 | 11.8 | 12.9 |
|  | (8) Heat aging resistance (%) | | 73 | 75 | 76 |
|  | (9) Color index | | 0.36 | 0.41 | 0.45 |

|  |  |  | Example 4 | Example 5 | Example 6 |
|---|---|---|---|---|---|
| Polymerization step | Polymerization solution | Phenolic compound | 2,6-Dimethylphenol | 2,6-Dimethylphenol | 2,6-Dimethylphenol |
|  |  | Aromatic solvent | Toluene | Toluene | Toluene |
|  |  | Catalyst | Cupric oxide Hydrogen bromide aqueous solution Di-t-butylethylene diamine Di-n-butylamine Butyldimethylamine | Cupric oxide Hydrogen bromide aqueous solution Di-t-butylethylene diamine Di-n-butylamine Butyldimethylamine | Cupric oxide Hydrogen bromide aqueous solution Di-t-butylethylene diamine Di-n-butylamine Butyldimethylamine |
|  | Polymerization conditions | | 40° C., 125 minutes | 40° C., 125 minutes | 40° C., 125 minutes |
| Precipitation step | Polar solvent | | Mixed liquid of methanol and water | Mixed liquid of methanol and water | Mixed liquid of methanol and water |
| Solid-liquid separation step | Separation method | | Filtration under reduced pressure | Filtration under reduced pressure | Filtration under reduced pressure |
| Washing step | Washing liquid (first cycle) | Aromatic solvent | Toluene 15.0 Mass % | Toluene 18.0 Mass % | Toluene 0.5 Mass % |
|  |  | Polar solvent | Methanol 85.0 Mass % | Methanol 82.0 Mass % | Methanol 99.5 Mass % |
|  | Solid-liquid separation method | | Filtration under reduced pressure | Filtration under reduced pressure | Filtration under reduced pressure |
|  | Washing liquid (second cycle) | Aromatic solvent | — | — | — |
|  |  | Polar solvent | — | — | — |
|  | Solid-liquid separation method | | — | — | — |
|  | No. of washing cycles | | 1 | 1 | 1 |
| Drying step | Drying temperature | | 140° C. | 140° C. | 140° C. |
| Evaluation | (1) Content of low molecular weight components (content (%) of PPE components having molecular weight of 500 or less) | | 0.27 | 0.27 | 0.41 |
|  | (2) Content of residual metal (residual metal concentration (mass ppm)) | | 0.59 | 0.58 | 0.78 |
|  | (3) Content of residual solvent (volatile content concentration (mass %)) | | 0.21 | 0.33 | 0.16 |
|  | (4) Reduced viscosity (dL/g) | | 0.52 | 0.53 | 0.50 |
|  | (5) Tensile strength (MPa) | | 87 | 89 | 80 |
|  | (6) Bending strength (MPa) | | 2223 | 2228 | 2149 |
|  | (7) Charpy impact strength (kJ/m$^2$) | | 13.8 | 14.1 | 9.5 |
|  | (8) Heat aging resistance (%) | | 78 | 80 | 70 |
|  | (9) Color index | | 0.50 | 0.60 | 0.36 |

|  |  |  | Example 7 | Example 8 | Comparative Example 1 |
|---|---|---|---|---|---|
| Polymerization step | Polymerization solution | Phenolic compound | 2,6-Dimethylphenol | 2,6-Dimethylphenol | 2,6-Dimethylphenol |
|  |  | Aromatic solvent | Toluene | Toluene | Toluene |
|  |  | Catalyst | Cupric oxide Hydrogen bromide aqueous solution Di-t-butylethylene diamine Di-n-butylamine Butyldimethylamine | Cupric oxide Hydrogen bromide aqueous solution Di-t-butylethylene diamine Di-n-butylamine Butyldimethylamine | Cupric oxide Hydrogen bromide aqueous solution Di-t-butylethylene diamine Di-n-butylamine Butyldimethylamine |
|  | Polymerization conditions | | 40° C., 125 minutes | 40° C., 125 minutes | 40° C., 125 minutes |
| Precipitation step | Polar solvent | | Mixed liquid of methanol and water | Mixed liquid of methanol and water | Mixed liquid of methanol and water |
| Solid-liquid separation step | Separation method | | Filtration under reduced pressure | Filtration under reduced pressure | Filtration under reduced pressure |
| Washing step | Washing liquid (first cycle) | Aromatic solvent | Toluene 3.5 Mass % | Toluene 15.0 Mass % | — |
|  |  | Polar solvent | Methanol 96.5 Mass % | Methanol 85.0 Mass % | Methanol 100 Mass % |
|  | Solid-liquid separation method | | Filtration under reduced pressure | Filtration under reduced pressure | Filtration under reduced pressure |
|  | Washing liquid (second cycle) | Aromatic solvent | Toluene 3.5 Mass % | Toluene 15.0 Mass % | — |
|  |  | Polar solvent | Methanol 96.5 Mass % | Methanol 85.0 Mass % | — |
|  | Solid-liquid separation method | | Filtration under reduced pressure | Filtration under reduced pressure | — |
|  | No. of washing cycles | | 2 | 2 | 1 |

TABLE 1-continued

| Drying step | Drying temperature | 140° C. | 140° C. | 140° C. |
|---|---|---|---|---|
| Evaluation | (1) Content of low molecular weight components (content (%) of PPE components having molecular weight of 500 or less) | 0.29 | 0.23 | 0.43 |
| | (2) Content of residual metal (residual metal concentration (mass ppm)) | 0.57 | 0.51 | 0.83 |
| | (3) Content of residual solvent (volatile content concentration (mass %)) | 0.15 | 0.20 | 0.16 |
| | (4) Reduced viscosity (dL/g) | 0.51 | 0.53 | 0.50 |
| | (5) Tensile strength (MPa) | 85 | 91 | 78 |
| | (6) Bending strength (MPa) | 2226 | 2250 | 2098 |
| | (7) Charpy impact strength (kJ/m$^2$) | 13.8 | 14.2 | 9.2 |
| | (8) Heat aging resistance (%) | 77 | 82 | 67 |
| | (9) Color index | 0.33 | 0.46 | 0.36 |

INDUSTRIAL APPLICABILITY

Through the presently disclosed method for producing PPE, it is possible to provide PPE having a good balance of mechanical properties, heat aging resistance, and color, and in which the content of low molecular weight components, such as oligomer, trimer, and dimer, and residual metal is low.

The invention claimed is:

1. A method for producing polyphenylene ether comprising:
performing oxidative polymerization of a phenolic compound in a polymerization solution containing the phenolic compound, a catalyst, and at least one aromatic solvent selected from the group consisting of benzene, toluene, xylene, and ethylbenzene to obtain a polyphenylene ether mixed liquid;
precipitating polyphenylene ether to obtain a slurry containing particulate polyphenylene ether by adding, to the polyphenylene ether mixed liquid, at least one polar solvent selected from the group consisting of water, a ketone having a carbon number of 1-10, and an alcohol having a carbon number of 1-10;
solid-liquid separating the slurry to obtain wet polyphenylene ether particles;
performing a washing and solid-liquid separation process by washing the wet polyphenylene ether particles with a washing liquid containing at least one aromatic solvent selected from the group consisting of benzene, toluene, xylene, and ethylbenzene and at least one polar solvent selected from the group consisting of water, a ketone having a carbon number of 1-10, and an alcohol having a carbon number of 1-10, and solid-liquid separating the polyphenylene ether particles and the washing liquid to obtain polyphenylene ether particles; and
drying the polyphenylene ether particles.

2. The method for producing polyphenylene ether of claim 1, wherein
the washing and solid-liquid separation process are performed for at least two cycles.

3. The method for producing polyphenylene ether of claim 2, wherein
in a final cycle of the washing and solid-liquid separation process, the polyphenylene ether particles are obtained by solid-liquid separation after washing with a washing liquid containing 3.5 mass % to 15 mass % of the aromatic solvent and 85 mass % to 96.5 mass % of the polar solvent.

4. The method for producing polyphenylene ether of claim 1, wherein
the washing liquid contains 3.5 mass % to 15 mass % of the aromatic solvent and 85 mass % to 96.5 mass % of the polar solvent.

5. The method for producing polyphenylene ether of claim 1, wherein
polyphenylene ether is obtained in which content of polyphenylene ether components having a molecular weight of 500 or less is 0.3 mass % or less.

6. The method for producing polyphenylene ether of claim 1, further comprising obtaining a recovered solution or a purified recovered solution resulting from purification of the recovered solution, the recovered solution containing at least one selected from the group consisting of a separated liquid separated in the solid-liquid separating, a separated liquid separated in the washing and solid-liquid separation process, and a condensate liquefied from vent gas vaporized in the drying, wherein the recovered solution or the purified recovered solution that is obtained is used as the washing liquid.

7. The method for producing polyphenylene ether of claim 3, further comprising obtaining a recovered solution or a purified recovered solution resulting from purification of the recovered solution, the recovered solution containing at least one selected from the group consisting of a separated liquid separated in the solid-liquid separating, a separated liquid separated in the washing and solid-liquid separation process, and a condensate liquefied from vent gas vaporized in the drying, wherein the recovered solution or the purified recovered solution that is obtained is used as the washing liquid.

8. The method for producing polyphenylene ether of claim 4, further comprising obtaining a recovered solution or a purified recovered solution resulting from purification of the recovered solution, the recovered solution containing at least one selected from the group consisting of a separated liquid separated in the solid-liquid separating, a separated liquid separated in the washing and solid-liquid separation process, and a condensate liquefied from vent gas vaporized in the drying, wherein the recovered solution or the purified recovered solution that is obtained is used as the washing liquid.

* * * * *